US006595398B2

(12) United States Patent
Himel, Jr.

(10) Patent No.: US 6,595,398 B2
(45) Date of Patent: Jul. 22, 2003

(54) VEHICLE-MOUNTED WHEELCHAIR SUPPORT RACK ASSEMBLY WITH LIFTING CAPABILITY

(75) Inventor: Edmond E. Himel, Jr., New Orleans, LA (US)

(73) Assignee: Succession of Edmond E. Himel, Jr., New Orleans, LA (US)

( * ) Notice: Subject to any disclaimer, the term of this patent is extended or adjusted under 35 U.S.C. 154(b) by 0 days.

(21) Appl. No.: 09/962,668

(22) Filed: Sep. 26, 2001

(65) Prior Publication Data

US 2003/0057243 A1 Mar. 27, 2003

(51) Int. Cl.[7] .................................................. B60R 9/06
(52) U.S. Cl. ........................ 224/495; 224/523; 224/532; 224/534; 414/462
(58) Field of Search ................................. 224/519, 495, 224/523, 531, 532, 534, 521; 414/462

(56) References Cited

U.S. PATENT DOCUMENTS

| | | | | |
|---|---|---|---|---|
| 3,528,578 A | * | 9/1970 | Schoenberger | 414/462 |
| 3,800,967 A | * | 4/1974 | Kosecoff | 414/462 |
| 4,084,736 A | * | 4/1978 | Jacobs, Jr. | 414/462 |
| 4,297,069 A | * | 10/1981 | Worthington | 414/462 |
| 4,400,129 A | * | 8/1983 | Eisenberg et al. | 414/462 |
| 4,573,854 A | * | 3/1986 | McFarland | 414/462 |
| 4,738,581 A | * | 4/1988 | Kuhlman | 414/462 |
| 4,775,282 A | * | 10/1988 | Van Vliet | 414/462 |
| 5,011,361 A | * | 4/1991 | Peterson | 414/462 |
| 5,482,424 A | * | 1/1996 | Jones et al. | 414/462 |
| 5,984,613 A | * | 11/1999 | Motilewa | 414/462 |
| 6,105,843 A | * | 8/2000 | Dollesin | 224/509 |
| 6,260,752 B1 | * | 7/2001 | Dollesin | 224/524 |

* cited by examiner

*Primary Examiner*—Stephen P. Garbe
(74) *Attorney, Agent, or Firm*—George A. Bode; Lisa D. Velez; Bode & Associates

(57) ABSTRACT

A vehicle-mounted wheelchair rack assembly with lifting capabilities for transporting a folded wheelchair at the rear of a vehicle. The rack assembly integrates a jack assembly into a stationary L-shaped frame coupled to the rear of the vehicle. Additionally, the jack assembly is coupled to a telescopic T-joint member wherein actuation of the jack assembly moves a vertical casing of the T-joint member along a vertical strut member of the L-shaped frame. The vertical strut member has a longitudinal opening or channel which has a length that defines a continuous range for lifting or elevating or, alternately, lowering the T-joint member and a folded wheelchair strapped to the T-joint member.

20 Claims, 5 Drawing Sheets

VEHICLE-MOUNTED WHEELCHAIR SUPPORT RACK ASSEMBLY WITH LIFTING CAPABILITY

BACKGROUND OF THE INVENTION

1. Field of the Invention

The present invention relates to vehicle-mounted wheelchair holders or racks and, more particularly, to a vehicle-mounted wheelchair support rack assembly with lifting capability.

2. General Background

Bumper-mounted racks for wheelchairs, bicycles or the like are well known. For example, U.S. Pat. Nos. 3,841,544, 4,050,616, 3,800,967 are examples of known bumper-mounted racks. Bumper-mounted racks fix the elevation of the rack handles or arms which support the bicycles or wheelchair at a distance above the ground so that the wheels do not engage the ground or road during transport. Typically, cyclists are not encumbered by lifting a bicycle onto such a rack. However, in many instances lifting a wheelchair onto a bumper-mounted rack can be very strenuous especially for senior citizens or other care takers.

Several apparatus have been patented which are aimed at wheelchair lifting devices.

U.S. Pat. No. 4,297,069, issued to Worthington, entitled "CHAIR CARRIER" discloses a wheelchair carrier attached to the rear of a wheel which includes a winch and winch cable to pull or lift a wheelchair.

U.S. Pat. No. 3,638,813, issued to Strong, entitled "WHEELCHAIR LIFTING DEVICE" and U.S. Pat. No. 4,738,581, issued to Kahlman, entitled "VEHICLE MOUNTED WHEELCHAIR CARRIER" both disclose wheelchair lifting devices which include hydraulic pressurized lifting cylinders.

As will be seen more fully below, the present invention is substantially different in structure, methodology and approach from that of the prior wheelchair lifting devices.

SUMMARY OF THE PRESENT INVENTION

The preferred embodiment of the vehicle-mounted wheelchair support rack assembly with lifting capability of the present invention solves the aforementioned problems in a straight forward and simple manner.

Broadly, what is provided is a vehicle-mounted wheelchair support rack assembly for transporting a wheelchair and for use with a vehicle with a rear end coupler. The vehicle-mounted wheelchair support rack assembly comprises a stationary L-shaped frame including a vertical strut member and a horizontal strut member wherein the horizontal strut member is adapted to be coupled to the rear end coupler; a telescopic T-joint member telescopically coupled to move up or, alternately, down along said vertical strut member, said telescopic T-joint member having a vertical casing surrounding said vertical strut member and a horizontal crossbar member; a pair of support arms coupled in spaced relation to said horizontal crossbar member for supporting said wheelchair; and, a jack assembly integrated in said stationary L-shaped frame and coupled to said telescopic T-joint member wherein actuation of the jack assembly moves said vertical casing along said vertical strut member.

In a first embodiment, the present invention contemplates a vehicle-mounted wheelchair support rack assembly which includes a jack assembly which comprises a threaded screw rod is rotatably coupled in said vertical strut member and accessible through a longitudinal channel in the vertical strut member and having a top end projection through such vertical strut member; a jack actuating member coupled to said top end of said threaded screw rod; and, a sliding rod coupler slidable coupled to said threaded screw rod and coupled to said vertical casing through said longitudinal opening wherein rotation of said jack actuating member in a first direction moves or slides said sliding rod coupler along said threaded screw rod in a first direction and in a second direction moves or slides said sliding rod coupler along said threaded screw rod in a second direction.

In another embodiment, the present invention contemplates a vehicle-mounted wheelchair support rack assembly which includes a jack assembly which comprises a jack shaft coupled in said vertical strut member and accessible through a longitudinal channel formed in the vertical strut member; a jack actuating lever subassembly coupled to said jack shaft through said longitudinal opening; and, a lever subassembly housing surrounding said vertical strut member and affixed to said T-joint member wherein said T-joint member moves in unison therewith actuation of the lever subassembly cooperates with said jack shaft to move or slide said lever subassembly housing up or, alternately, down said vertical strut member.

In view of the above, an object of the present invention is to provide a vehicle-mounted wheelchair support rack assembly which includes a pair of support arms for supporting, preferably, a folded wheelchair about the wheelchair's arms wherein the pair of support arms are supported by a telescopic T-joint member.

Another object of the present invention is to provide a vehicle-mounted wheelchair support rack assembly with lifting capability so that the supported wheelchair can be lifted or raise above the ground a sufficient height to not interfere with the vehicle's operation.

A further object of the present invention is to provide a vehicle-mounted wheelchair support rack assembly with lifting capability which is easily operated with little expenditure of energy, especially, by the elderly.

A still further object of the present invention is to provide a vehicle-mounted wheelchair support rack assembly with lifting capability which can accommodate a variety of wheelchair sizes.

In view of the above, a feature of the present invention is to provide a vehicle-mounted wheelchair support rack assembly with lifting capability which is easy to use.

Another feature of the present invention is to provide a vehicle-mounted wheelchair support rack assembly with lifting capability which is easy to install at the rear of the vehicle.

A further feature of the present invention is to provide a vehicle-mounted wheelchair support rack assembly with lifting capability which is relatively structurally simple.

A still further feature of the present invention is to provide a vehicle-mounted wheelchair support rack assembly with lifting capability which is capable of elevating a wheelchair above the ground at a variety of heights with little or no need for modifications to the rack assembly or vehicle. In other words, the vehicle-mounted wheelchair support rack assembly accommodates a variety of wheelchair heights (i.e., the distance from the bottom of the wheelchair's wheel to the horizontal bar of the wheelchairs arm) and a variety of vehicle elevations (i.e., the elevation of a vehicle's underside above the ground).

A still further feature of the present invention is to provide a vehicle-mounted wheelchair support rack assembly with lifting capability having a jack assembly which provides a means for lifting the wheelchair essentially continuously within a defined range (the length of the longitudinal opening) to a desired elevation to accommodate for the variety of wheelchair heights and the variety of vehicle elevations.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
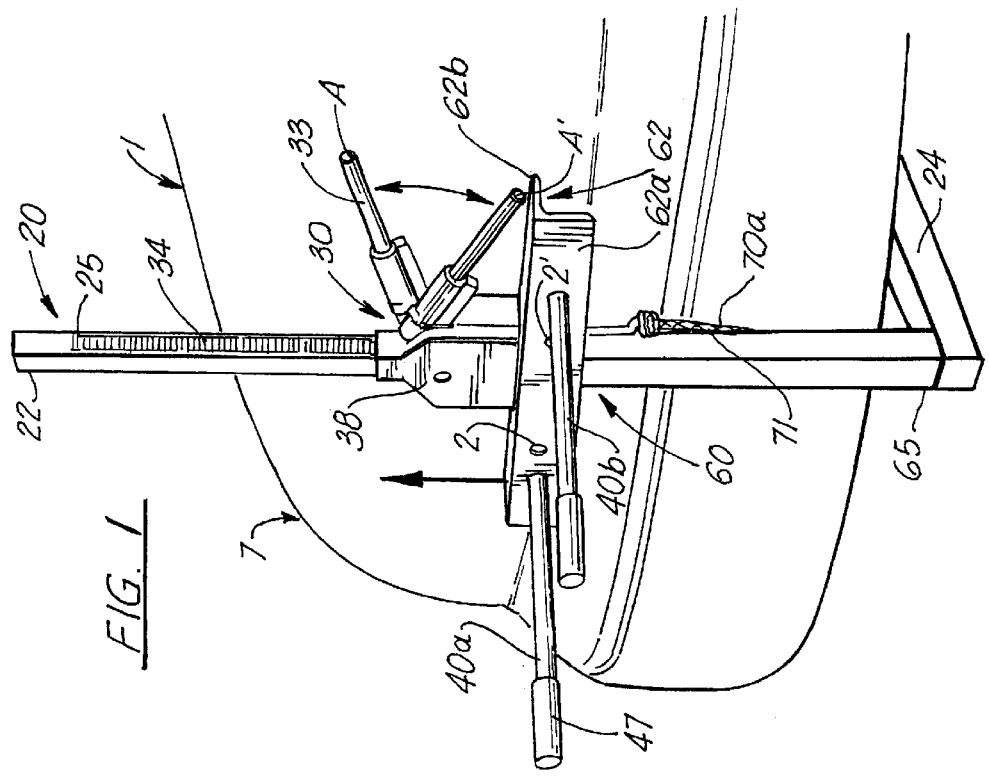
FIG. 1 illustrates a perspective view of the vehicle-mounted wheelchair support rack assembly with lifting capability of the present invention.
Figure 2:
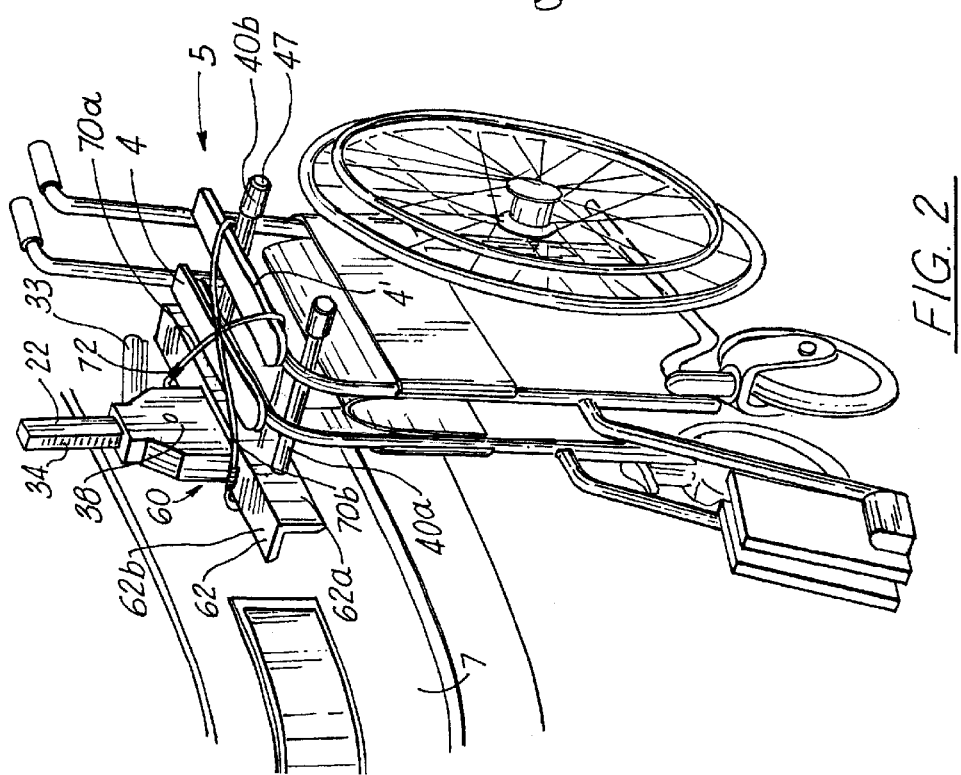
FIG. 2 illustrates the vehicle-mounted wheelchair support rack assembly with lifting capability supporting a folded wheelchair.

Referring now to the drawings and in particular FIGS. 1–2, the vehicle-mounted wheelchair support rack assembly with lifting capability of the present invention is generally referenced by the numeral 10. The wheelchair 5, as best seen in FIG. 2, is capable of being folded or collapsed when not in use.

The vehicle-mounted wheelchair support rack assembly 10 includes a L-shaped frame 20 with a pair of support arms 40a and 40b affixed to a slidable or telescopic T-joint member 60. The vehicle-mounted wheelchair support rack assembly 10 further includes a lifting mechanism or jack assembly 30 for raising and, alternately, lowering the T-joint member 60 in accordance with the lifting capabilities of the present invention.

The pair of support arms 40a and 40b are illustrated as essentially straight cylindrical members, each having one distal end affixed to the crossbar member 62 of the slidable T-joint member 60. The free distal ends of the pair of support arms 40a and 40b are each covered with a respective jacket or rubber handle 47 friction fit coupled or adhesively affixed thereto.

In an alternate embodiment, the jacket or rubber handle 47 may be substituted with a plug friction fit coupled in a hole at the end of the pair of support arms 40a and 40b. A further embodiment would include a rubber jacket surrounding the full length of each support arm 40a or 40b to eliminate metal-to-metal contact between the wheelchair arms and the pair of support arms 40a and 40b. Moreover, in an alternate embodiment, the pair of support arms 40a and 40b may be curved upward toward the free distal end.

In the exemplary embodiment, the vehicle-mounted wheelchair support rack assembly 10 includes strapping members 70a and 70b which strap the folded wheelchair 5 to the pair of support arms 40a and 40b and to the horizontal crossbar member 62 of the slidable T-joint member 60. Since the strapping members are essentially identical only one strapping member will be described in detail.

The strapping member 70a includes a resilient rubber cord or bungy cord member 71 having hook 72 on one distal end thereof and the other end is secured to the vertical plate member 62a at one of the holes 2 or 2' formed therein. The horizontal crossbar member 62 includes a L-bracket having a vertical plate member 62a and a horizontal plate member 62b wherein the hooks 72 are secured or hooked about the horizontal plate member 62b.

Figure 3:
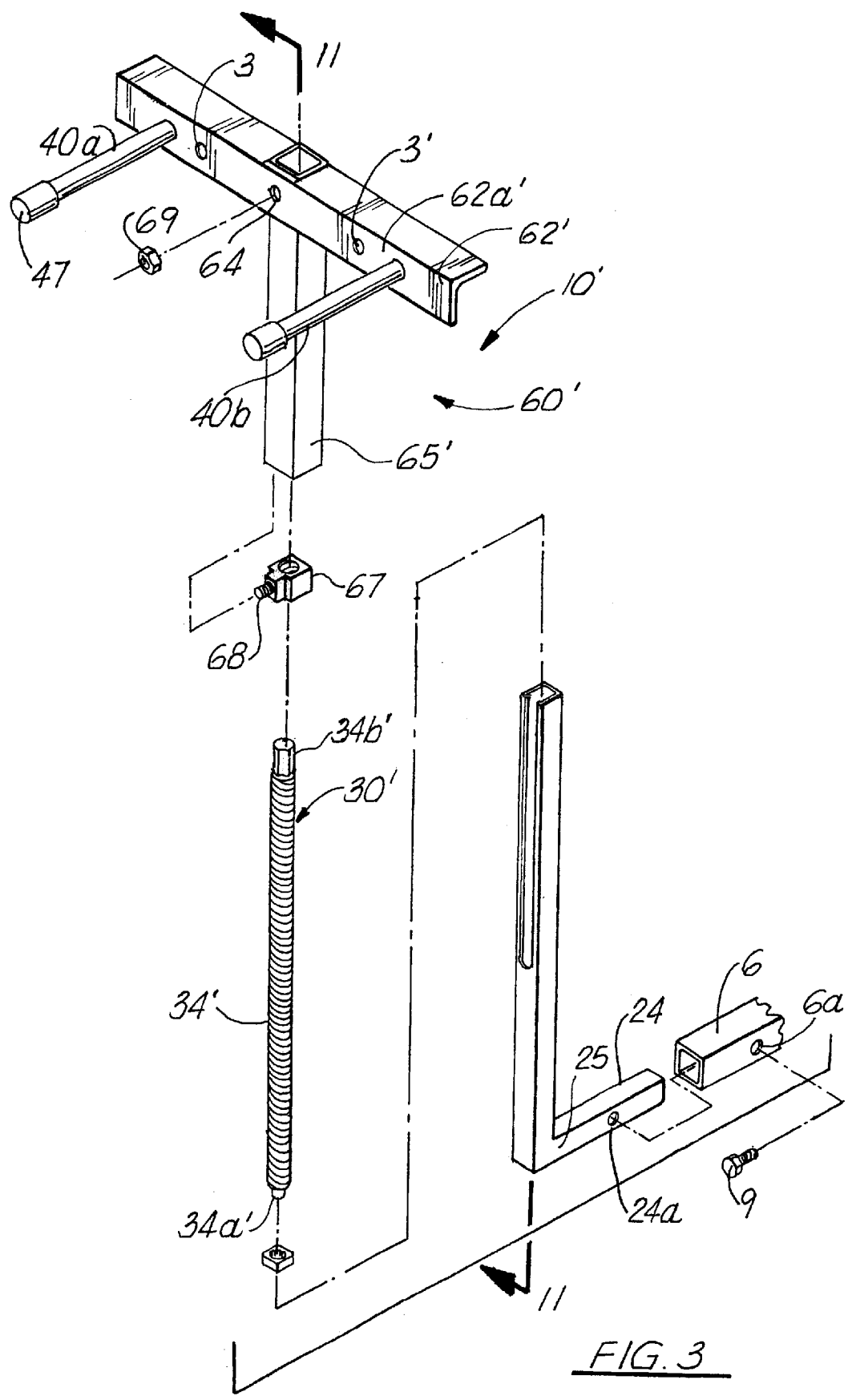
FIG. 3 illustrates an exploded view of an alternate embodiment of the vehicle-mounted wheelchair support rack assembly with lifting capability of the present invention.

The L-shaped frame 20 includes an up-standing hollow strut member 22 and a horizontal hollow strut member 24 coupled essentially perpendicular to the up-standing hollow strut member 22. Referring also to FIG. 3, the free end of the horizontal hollow strut member 24 includes a hole 24a. In the exemplary embodiment, the free end of the horizontal hollow strut member 24 is mated to be received in vehicle coupler 6 affixed to the underside of the vehicle 1 close to the vehicle's rear end 7. The vehicle coupler 6 is hollow and receives therein the free end of the horizontal hollow strut member 24. The hole 24a in the horizontal hollow strut member 24 is aligned with the hole 6a in the vehicle coupler 6 and secured via fastener, pin or bolt 9.

Referring again to FIG. 2, The up-standing hollow strut member 22 includes a longitudinal opening or channel 25. The up-standing hollow strut member 22 has a jack bar or jack shaft 34 of the lifting mechanism or jack assembly 30 extending longitudinally in the up-standing hollow strut member 22 and which is accessible through the longitudinal opening or channel 25.

The slidable T-joint member 60 has a horizontal crossbar member 62 and a telescopic vertical casing 65 perpendicularly coupled to the horizontal crossbar member 62. The telescopic vertical casing 65 has incorporated therewith the jack actuating lever or handle subassembly 33 of the lifting mechanism or jack assembly 30. The jack actuating lever or handle subassembly 33 is adapted to cooperate in conjunction with the jack bar or jack shaft 34 to lift or lower the slidable T-joint member 60. The jack actuating lever or handle subassembly 33 includes a lever subassembly housing 38 coupled to the slidable T-joint member 60 and which wraps around upstanding hollow strut member 22 and engages the jack bar or jack shaft 34 through the longitudinal opening or channel 25. As the jack actuating lever or handle subassembly 33 is pumped between positions A and A', the lever subassembly housing 38 slides up or down the jack bar or jack shaft 34. Such lever subassembly housing 38 has the telescopic vertical casing 65 of the slidable T-joint member 60 coupled thereto and which moves in unison therewith.

In the embodiment of FIG. 2, the jack bar or jack shaft 34 may be a ratchet shaft, a grooved shaft or the like and the jack actuating lever or handle subassembly 33 may include a pawl or the like (NOT SHOWN). Since the operation of a jack is well know no further explanation will be provided. It should be further noted that a switching mechanism (NOT SHOWN) is provided to change the direction of movement of the lever subassembly housing 38 and thus the slidable T-joint member 60 as the jack actuating lever or handle subassembly 33 is pumped between positions A and A'.

In the preferred embodiment, the wheelchair 5 is stored on the vehicle-mounted wheelchair support rack assembly 10 when folded or collapsed. When storing the wheelchair 5, the wheelchair 5 should be rolled up to the vehicle-mounted wheelchair support rack assembly 10 at the rear end 7 of the vehicle 1. Thereafter, the wheelchair 5 should be maneuvered so that the pair of support arms 40a and 40b are slipped under at least one of the horizontal bars of the wheelchair arms 4 or 4'. If the wheelchair 5 was not previously collapsed, the wheelchair 5 should then be collapsed or folded so that the wheelchair arms 4 or 4' are side-by-side. The wheelchair arms 4 or 4' are then strapped to the vehicle-mounted wheelchair support-rack assembly 10 via strapping members 70a and 70b. Once the wheelchair 5 is strapped, the wheelchair 5 may then be lifted by pumping the jack actuating lever or handle subassembly 33 between positions A and A' to a desired height or elevation above the ground or road.

To remove the wheelchair 5, the lifting mechanism or jack assembly 30 should be switched to permit lowering. The jack actuating lever or handle subassembly 33 is then pumped between positions A and A' until the wheelchair's wheel touch the ground or road. Thereafter, the wheelchair 5 is unstrapped and the strapping members 70a and 70b are removed. The wheelchair 5 is then ready to be moved away from the pair of support arms 40a and 40b.

Figures 4, 5:
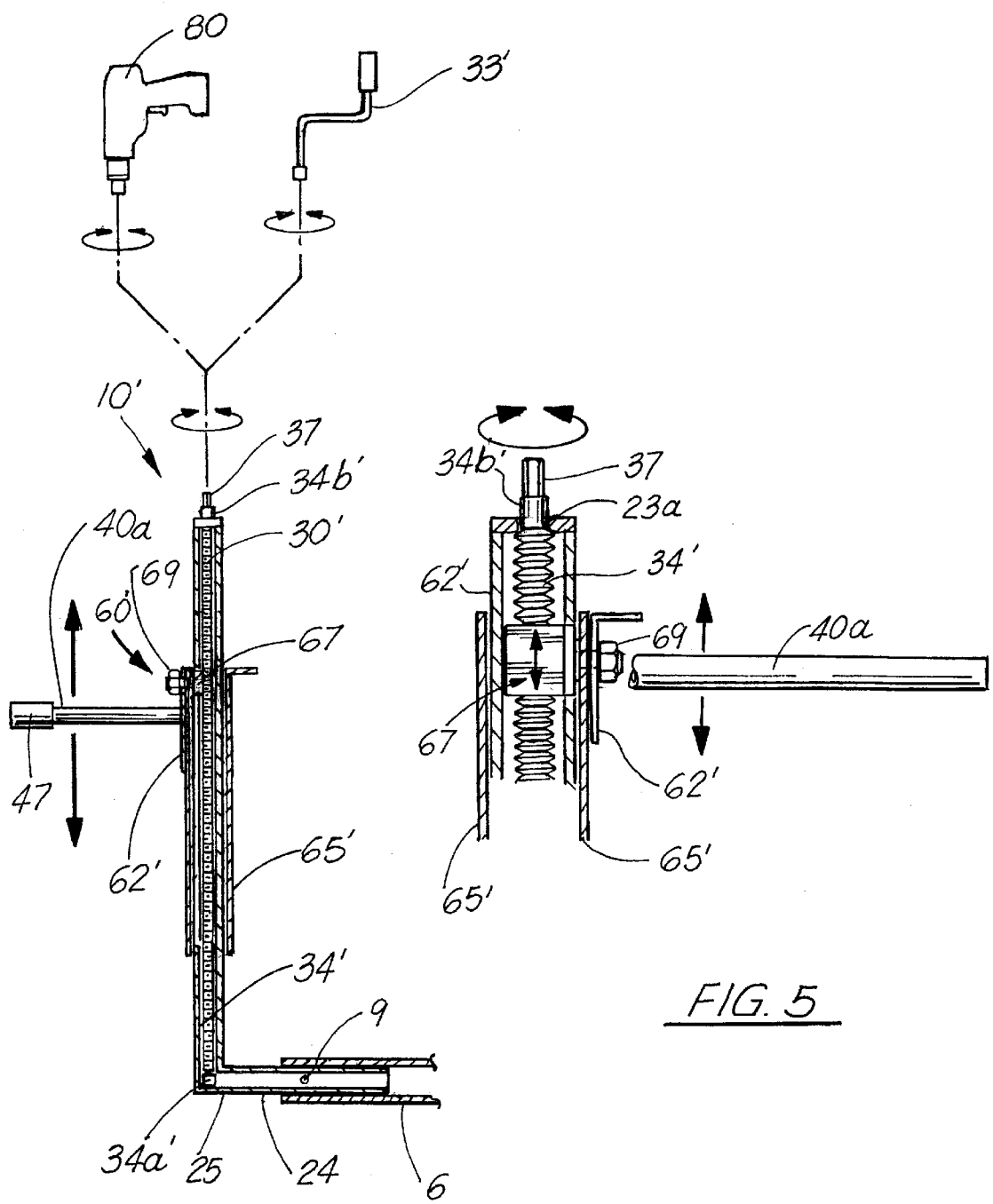
FIG. 4 illustrates a cross-sectional view of the embodiment of FIG. 3.
FIG. 5 illustrates a partial view of L-shaped frame with the jack bar (threaded screw rod) of the embodiment of FIG. 3.

Referring now to FIGS. 3–5, an alternate embodiment of the vehicle-mounted wheelchair support rack assembly 10' is shown. In general, the vehicle-mounted wheelchair support rack assembly 10' differs from the vehicle-mounted wheelchair support rack assembly 10 of FIGS. 1–2 in that the jack bar or jack shaft 34' of the lifting mechanism or jack assembly 30' is a threaded screw rod. Moreover, the jack actuating lever or handle subassembly 33 and lever subassembly housing 38 have been eliminated.

Also in this embodiment, the slidable T-joint member 60' includes a slide rod coupler 67 coupled to the interior of the telescopic vertical casing 65' and which is threaded for engagement with the threaded screw rod 34'. The slidable T-joint member 60' has been modified such that the crossbar member 62' includes only a vertical plate member 62a' affixed directly to the telescopic vertical casing 65'. The vertical plate member 62a' includes holes 3 and 3' for connection of strapping members (NOT SHOWN) essentially identical or similar to the strapping members 70a and 70b.

In the exemplary embodiment, the slide rod coupler 67 includes a threaded bolt or fastener 68 which is received in a hole 64 formed through the top of the telescopic vertical casing 65' and the vertical plate member 62a' affixed thereto. Moreover, the threaded bolt or fastener 68 projects through the longitudinal channel or opening 25' in the vertical hollow strut member 22'. Nut 69 is screwed onto the end of the threaded bolt or fastener 68 projecting through hole 64 thus securing the slide rod coupler 67 in the telescopic vertical casing 65'.

The threaded screw rod 34' is rotatable supported within the vertical hollow strut member 22' at the upper and lower ends thereof. Lower distal end 34a' of the threaded screw rod 34' is rotatably coupled to bottom wall 25 of the horizontal hollow strut member 24. The upper distal end 34b' of the threaded screw rod 34' is rotatably coupled through aperture 23a in the top end 23 of the vertical hollow strut member 22'.

The upper distal end 34b' of threaded screw rod 34' includes a male coupler 37 which projects through aperture 23a and is adapted to be connected to one of crank handle 33' or drill device or other hand-powered unit 80.

In operation, as the threaded screw rod 34' is rotated in a first direction, via crank handle 33' or alternately, drill device 80 or other jack actuating member, the threaded screw rod 34' rotates in a first direction. As the threaded screw rod 34' rotates in such first direction, the slide rod coupler 67 move upward to lift, raise or elevate the telescopic vertical casing 65'. Thus, the pair of support arms 40a and 40b supporting the collapsed wheelchair 5 (FIG. 2) are lifted, raised or elevated so as to raise the wheels of the wheelchair 5 above the ground or road.

However, as the threaded screw rod 34' is rotated in a second direction, via crank handle 33' or alternately, drill device 80 or other jack actuating member, the threaded screw rod 34' rotates in a second direction. As the threaded screw rod 34' rotates in such second direction, the slide rod coupler 67 move downward to lower the telescopic vertical casing 65'. Thus, the pair of support arms 40a and 40b supporting the collapsed wheelchair 5 (FIG. 2) are lowered so that the wheels of the wheelchair 5 engage or rest upon the ground or road.

As can be readily seen, lifting mechanism or jack assemblies 30 and 30' are integrated into the L-shaped frames 20 and 20' respectively and are coupled to the telescopic T-joint members 60 and 60', respectively wherein actuation of the jack assemblies moves the vertical casings 65 and 65', respectively.

In view of the forgoing, the vehicle-mounted wheelchair support rack assembly 10 or 10' with lifting capability is capable of elevating a wheelchair 5 above the ground at a variety of heights with little or no need for modifications to the rack assembly 10 or 10' or vehicle 1. Thus, the vehicle-mounted wheelchair support rack assembly 10 or 10' accommodates a variety of wheelchair heights (i.e., the distance from the bottom of the wheelchair's wheel to the horizontal bar of the wheelchairs arm) and a variety of vehicle elevations (i.e., the elevation of a vehicle's underside above the ground).

Moreover, the jack assemblies 30 and 30' provide a means for lifting the wheelchair essentially continuously within a defined range (the length of the longitudinal channel or opening 25 or 25') to a desired elevation to accommodate for the variety of wheelchair heights and the variety of vehicle elevations.

Figure 6:
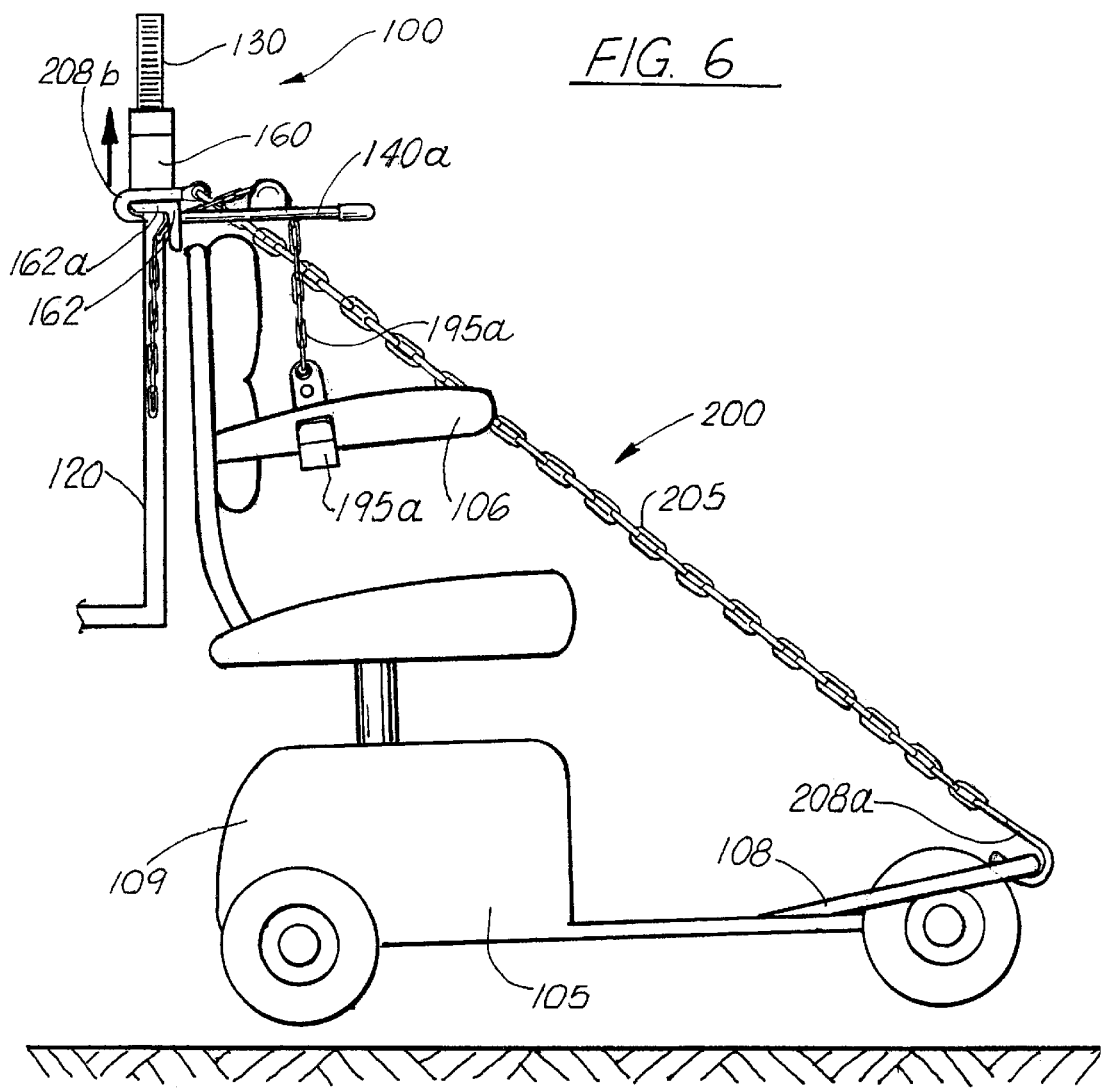
FIG. 6 illustrates a side view of a still further alternate embodiment of the vehicle-mounted wheelchair support rack assembly with lifting capability of the present invention in use supporting a motorized scooter or wheeled-chair.
Figure 7:
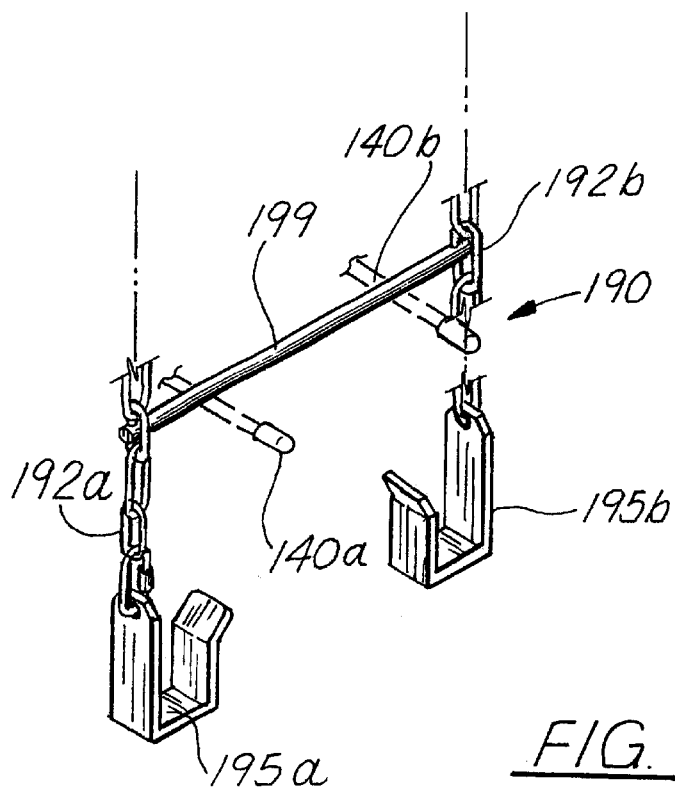
FIG. 7 illustrates a perspective view of a first strapping member of the embodiment of FIG. 6; and, FIG. 8 illustrates a perspective view of a second strapping member of the embodiment of FIG. 6.
Figure 8:
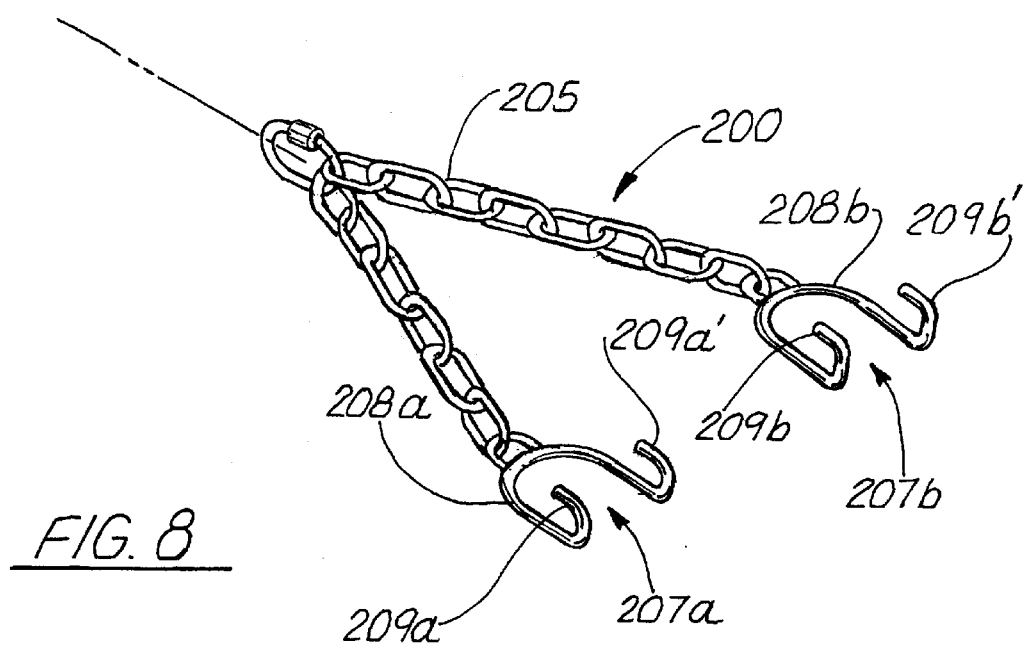

Referring now to FIGS. 6–8, in lieu of strapping members 70a and 70b, first and second strapping assemblies 190 (FIG. 7) and 200 (FIG. 8) are substituted therefor. The vehicle-mounted wheelchair support rack assembly 100 includes a L-shaped frame 120 with a pair of support arms 140a and 140b affixed to a slidable or telescopic T-joint member 160. The vehicle-mounted wheelchair support rack assembly 100 further includes a lifting mechanism or jack assembly 130 (similar to the lifting mechanism or jack assemblies 30 or 30') for raising and, alternately, lowering the T-joint member 160 in accordance with the lifting capabilities of the present invention.

The vehicle-mounted wheelchair support rack assembly 100 is adapted with stronger strapping assemblies 190 (FIG. 7) and 200 (FIG. 8) to support and carry a heavier wheeled-chair such as a motorized scooter 105. The first strapping assembly 190 includes two lengths of chain links 192a and 192b each with a U-shaped stirrup 195a and 195b attached at one free end thereof. In operation, the U-shaped stirrups 195a and 195b of the first strapping assembly 190 are designed to receive and support arms 106 of the motorized scooter 105.

In the exemplary embodiment, the two lengths of chain links 192a and 192b of the first strapping assembly 190 is supported by cross-rod member 199 adapted to have opposite ends thereof to be received or coupled to a link of the two lengths of chain links 192a and 192b, respectively. Preferably, the coupling provides for adjusting the length of the two lengths of chain links 192a and 192b. The cross-rod member 199 is supported by the pair of support arms 140a and 140b.

The second strapping assembly 200 includes a length of chain links 205 with U-shaped forked hooks 207a and 207b attached to opposite ends thereof. The U-shaped forked hooks 207a and 207b has U-shaped fork member 208a and 208b, respectively. The U-shaped fork member 208a has free ends which curve back upon itself to form hooks 209a and 209a'. Likewise, the U-shaped fork member 208b has free ends which curve back upon itself to form hooks 209b and 209b'. In operation, the second strapping member 200 is designed to support the front end 108 of the motorized scooter 105 via the U-shaped fork member 208a and 208b wherein the U-shaped fork member 208b hooks onto the L-shaped frame 120. In the exemplary embodiment, the U-shaped fork member 208b hooks to the vertical plate member 162a of the horizontal crossbar member 162.

In a still further alternate embodiment, the second strapping assembly 200 may be used in a manner which would allow the U-shaped fork member 208a to hook to the front end 108 of the motorized scooter 105 and the U-shaped fork member 208b to hook to the rear end 109 of the motorized scooter 105. In such embodiment, the length of chain links 205 would be secured and supported by the L-shaped frame 120, accordingly.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A vehicle-mounted wheelchair rack assembly for transporting a wheelchair and for use with a vehicle with a rear end coupler comprising:
    (a) a stationary L-shaped frame including a vertical strut member and a horizontal strut member wherein the horizontal strut member is adapted to be coupled to the rear end coupler;
    (b) a telescopic T-joint member telescopically coupled to move up or, alternately, down along said vertical strut member, said telescopic T-joint member having a vertical casing surrounding said vertical strut member and a horizontal crossbar member;
    (c) a pair of support arms coupled in spaced relation to said horizontal crossbar member for supporting said wheelchair; and,
    (d) a jack assembly integrated in said stationary L-shaped frame and coupled to said telescopic T-joint member wherein actuation of the jack assembly moves said vertical casing along said vertical strut member.

2. The rack assembly of claim 1, wherein:
said vertical strut member has formed therein a longitudinal opening; and,
said jack assembly comprises:
    a threaded screw rod is rotatably coupled in said vertical strut member and accessible through said longitudinal channel and having a top end projection through said vertical strut member,
    a jack actuating member coupled to said top end of said threaded screw rod, and
    a sliding rod coupler slidable coupled to said threaded screw rod and coupled to said vertical casing through said longitudinal opening wherein rotation of said jack actuating member in a first direction moves or slides said sliding rod coupler along said threaded screw rod in a first direction and in a second direction moves or slides said sliding rod coupler along said threaded screw rod in a second direction.

3. The rack assembly of claim 2, wherein said jack actuating member comprising a crank handle removably coupled to said top end of said threaded screw rod.

4. The rack assembly of claim 2, wherein said jack actuating member comprising a powered drill removably coupled to said top end of said threaded screw rod.

5. The rack assembly of claim 1, further comprising a strapping member for strapping a collapsed wheelchair about said pair of support arms.

6. The rack assembly of claim 1, wherein:
said vertical strut member has formed therein a longitudinal opening; and,
said jack assembly comprises:
    a jack shaft coupled in said vertical strut member and accessible through said longitudinal channel,
    a jack actuating lever subassembly coupled to said jack shaft through said longitudinal opening, and
    a lever subassembly housing surrounding said vertical strut member and affixed to said T-joint member wherein said T-joint member moves in unison therewith wherein actuation of the lever subassembly cooperates with said jack shaft to move or slide said lever subassembly housing up or, alternately, down said vertical strut member.

7. A vehicle-mounted wheelchair rack assembly for transporting a wheelchair and for use with a vehicle with a rear end coupler comprising:
    (a) a stationary L-shaped frame including a vertical strut member and a horizontal strut member wherein the horizontal strut member is adapted to be coupled to the rear end coupler;
    (b) a telescopic T-joint member telescopically coupled to move up or, alternately, down along said vertical strut member, said telescopic T-joint member having a vertical casing surrounding said vertical strut member and a horizontal crossbar member;
    (c) a pair of support arms coupled in spaced relation to said horizontal crossbar member for supporting said wheelchair; and,
    (d) a jack assembly integrated in said stationary L-shaped frame and coupled to said telescopic T-joint member wherein actuation of the jack assembly moves said vertical casing along said vertical strut member essentially continuously within a defined range to a desired elevation.

8. The rack assembly of claim 7, wherein:
said vertical strut member has formed therein a longitudinal opening having a length.

9. The rack assembly of claim 8, wherein:
said length of said longitudinal opening defines said defined range; and, said jack assembly comprises:
- a threaded screw rod is rotatably coupled in said vertical strut member and accessible through said longitudinal channel and having a top end projection through said vertical strut member,
- a jack actuating member coupled to said top end of said threaded screw rod, and
- a sliding rod coupler slidable coupled to said threaded screw rod and coupled to said vertical casing through said longitudinal opening wherein rotation of said jack actuating member in a first direction moves or slides said sliding rod coupler along said threaded screw rod in a first direction to said desired elevation and in a second direction moves or slides said sliding rod coupler along said threaded screw rod in a second direction toward ground.

10. The rack assembly of claim 9, wherein said jack actuating member comprising a crank handle removably coupled to said top end of said threaded screw rod.

11. The rack assembly of claim 9, wherein said jack actuating member comprising a powered drill removably coupled to said top end of said threaded screw rod.

12. The rack assembly of claim 8, wherein:
said length of said longitudinal opening defines said defined range; and,
said jack assembly comprises:
- a jack shaft coupled in said vertical strut member and accessible through said longitudinal channel,
- a jack actuating lever assembly coupled to said jack shaft through said longitudinal opening, and
- a lever assembly housing surrounding said vertical strut member and affixed to said T-joint member wherein said T-joint member moves in unison therewith wherein actuation of the lever assembly cooperates with said jack shaft to move or slide said lever assembly housing up or, alternately, down said vertical strut member.

13. The rack assembly of claim 7, further comprising a strapping member for strapping a collapsed wheelchair about said pair of support arms.

14. A vehicle-mounted wheeled-chair rack assembly for transporting a wheeled-chair and for use with a vehicle with a rear end coupler comprising:
(a) a stationary frame including a vertical member and which is adapted to be coupled to the rear end coupler, said vertical member having formed therein a longitudinal opening;
(b) a telescopic T-joint member telescopically coupled to move up or, alternately, down along said vertical strut member;
(c) a pair of support arms coupled in spaced relation to said telescopic T-joint member; and,
(d) a jack assembly integrated in said stationary frame and coupled to said telescopic T-joint member wherein actuation of the jack assembly moves said T-joint along said vertical member essentially continuously within a defined range to a desired elevation.

15. The rack assembly of claim 14, wherein:
said length of said longitudinal opening defines aid defined range; and,
said jack assembly comprises:
- a threaded screw rod is rotatably coupled in said vertical member and accessible through said longitudinal channel and having a top end projection through said vertical member,
- a jack actuating member coupled to said top end of said threaded screw rod, and
- a sliding rod coupler slidable coupled to said threaded screw rod and coupled to said T-joint member through said longitudinal opening wherein rotation of said jack actuating member in a first direction moves or slides said sliding rod coupler along said threaded screw rod in a first direction to said desired elevation and in a second direction moves or slides said sliding rod coupler along said threaded screw rod in a second direction toward ground.

16. The rack assembly of claim 15, wherein said jack actuating member comprises a crank handle removably coupled to said top end of said threaded screw rod.

17. The rack assembly of claim 15, wherein said jack actuating member comprises a powered drill removably coupled to said top end of said threaded screw rod.

18. The rack assembly of claim 14, wherein:
said length of said longitudinal opening defines said defined range; and,
said jack assembly comprises:
- a jack shaft coupled in said vertical member and accessible through said longitudinal channel,
- a jack actuating lever assembly coupled to said jack shaft through said longitudinal opening, and
- a lever assembly housing surrounding said vertical strut member and affixed to said T-joint member wherein said T-joint member moves in unison therewith wherein actuation of the lever assembly cooperates with said jack shaft to move or slide said lever assembly housing up or, alternately, down said vertical strut member.

19. The rack assembly of claim 14, further comprising a strapping member for strapping a collapsed or folded wheeled-chair about said pair of support arms.

20. The rack assembly of claim 14, wherein said wheeled-chair is a motorized scooter; and,
further comprising:
- a first strapping assembly including two lengths of chain links each with a U-shaped stirrup attached at one free end thereof wherein the U-shaped stirrups receive and support arms of said motorized scooter and wherein the two lengths of chain links are supported by a cross-rod member supported by the pair of support arms; and,
- a second strapping assembly which includes a length of chain links with two U-shaped forked hooks attached to opposite ends thereof wherein at least one U-shaped forked hook is coupled to a front end of the motorized scooter.

* * * * *